United States Patent [19]
Lin

[11] Patent Number: 6,056,369
[45] Date of Patent: May 2, 2000

[54] WHEEL SHAFT MOUNTING ARRANGEMENT FOR A GOLF CART

[76] Inventor: Wen-Tsan Lin, 7 F-3, No. 60-8 Taichung Kang Road, Section 2, Taichung, Taiwan

[21] Appl. No.: 09/261,948

[22] Filed: Mar. 3, 1999

[51] Int. Cl.[7] .................................................. B60B 23/00
[52] U.S. Cl. ..................... 301/111; 301/719; 301/125; 301/122; 280/DIG. 6
[58] Field of Search ................................ 301/1, 111, 112, 301/119, 125, 126, 131, 132, 133, 122; 16/29, 45; 190/18 A; 280/DIG. 6, 642, 645, 647, 652, 654

[56] References Cited

U.S. PATENT DOCUMENTS

| | | | |
|---|---|---|---|
| 597,315 | 1/1898 | Day | 301/121 |
| 672,031 | 4/1901 | Clouse | 301/121 |
| 1,188,337 | 6/1916 | Siebert et al. | 301/121 |
| 1,431,242 | 10/1922 | Lindberg | 301/121 |
| 2,175,646 | 10/1939 | Replogle | 15/360 |
| 2,275,302 | 3/1942 | Magnuson | 301/125 |
| 4,978,175 | 12/1990 | Wu | 301/121 |
| 5,029,946 | 7/1991 | Liao | 301/111 |
| 5,096,236 | 3/1992 | Thony | 403/316 |
| 5,171,068 | 12/1992 | Wu | 280/DIG. 6 |
| 5,172,998 | 12/1992 | Hatagishi | 403/27 |
| 5,507,566 | 4/1996 | Chen | 301/121 |
| 5,529,385 | 6/1996 | Tsao | 301/111 |
| 5,658,054 | 8/1997 | Wu | 301/111 |
| 5,957,543 | 9/1999 | Wu | 301/111 |
| 5,997,105 | 12/1999 | Wu | 301/126 |
| 6,003,956 | 12/1999 | Wu | 301/11 |

*Primary Examiner*—Mark T. Le
*Assistant Examiner*—Long Bao Nguyen
*Attorney, Agent, or Firm*—Pro-Techtor International Services

[57] ABSTRACT

A wheel shaft mounting arrangement, which includes a shaft holder securely mounted, on the framework of a golf cart to hold a shaft and a wheel on the shaft, wherein the shaft has an axial coupling hole and two transverse locating holes at a rectangular front end thereof; the shaft holder has an open chamber, which receives the rectangular front end of the shaft, a rectangular locating block disposed inside the open chamber which is fitted into the rectangular coupling hole at the shaft when the shaft is inserted into the open chamber, a hook hole at a back side wall thereof, a movable plate hinged to a fixed plate in the open chamber at a top side, the movable plate having a rectangular plug rod and a hook that are respectively engaged into one transverse locating hole at the shaft and the hook hole at the shaft holder to lock the shaft when the movable plate is closed on the open chamber.

2 Claims, 4 Drawing Sheets

WHEEL SHAFT MOUNTING ARRANGEMENT FOR A GOLF CART

BACKGROUND OF THE INVENTION

The present invention relates to a golf cart, and more specifically to a wheel shaft mounting arrangement for a golf cart.

A regular wheel shaft mounting arrangement for a golf cart, as shown in FIG. 1, is generally comprised of a shaft A, which supports a wheel and has a screw hole A1 axially extended to its one end, a shaft holder B, which is securely mounted on the framework of a golf cart and has an axle hole B1, which receives the front end of the shaft A, and a screw cap C, which is threaded into the screw hole A1, to secure the shaft A to the shaft holder B. This wheel shaft mounting arrangement has drawbacks. Because the shaft A is secured to the shaft holder B by the screw cap C, it takes much time to thread the screw cap C into the screw hole A at the shaft A, or to disengage the screw cap C, from the screw hole A at the shaft A. Further, this wheel shaft mounting arrangement is not durable in use because the outer threads at the screw cap C and the inner threads in the screw hole A1 tend to be damaged when the golf cart runs over an uneven road surface.

SUMMARY OF THE INVENTION

The present invention has been accomplished to provide a wheel shaft mounting arrangement, which eliminates the aforesaid drawbacks. It is one object of the present invention to provide a wheel shaft mounting arrangement, which enables the user to mount/dismount, the wheel shaft easily efficiently. It is another object of the present invention to provide a wheel shaft mounting arrangement, which is durable in use. To achieve these and other objects of the present invention, there is provided a wheel shaft mounting arrangement, which is comprised of a shaft, which supports a wheel, and a shaft holder, which is securely mounted on the framework of a golf cart to hold the shaft. The shaft holder comprises a hinged movable plate, which is turned between a closed position to lock the shaft, and an opened position to unlock the shaft. The hinged movable plate comprises a rectangular plug rod and a hook. When the hinged movable plate is closed after the shaft has been inserted into an open chamber at the shaft holder, the plug rod is plugged into a locating hole at the shaft to lock the shaft, and the hook is hooked in a hook hole at, the shaft holder to hold the hinged movable plate in the closed position. Further, a torsion spring is provided to pull the hinged movable plate from the opened position to the closed position.

DETAILED DESCRIPTION OF THE PREFERRED EMBODIMENT

Figure 1:
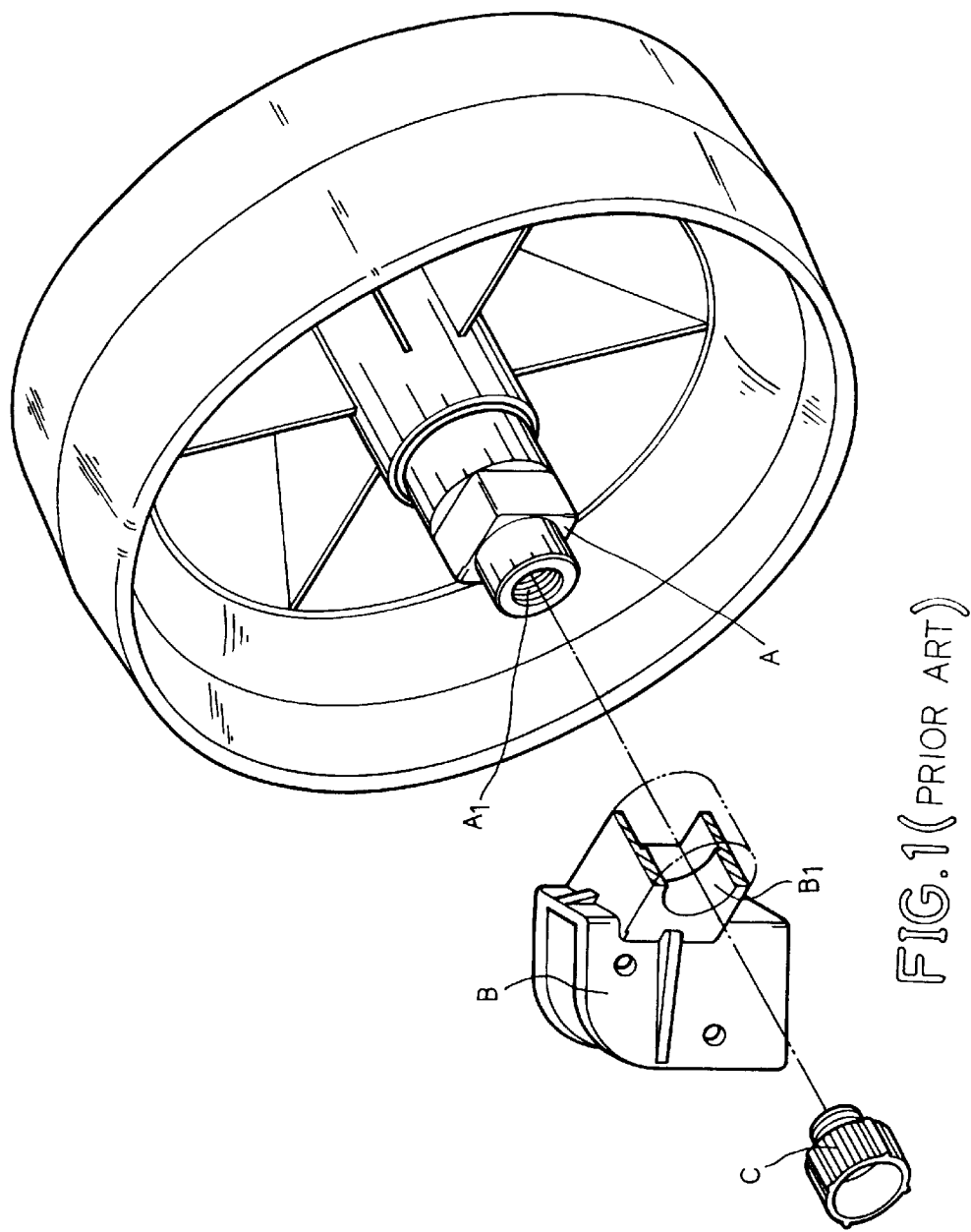
FIG. 1 is an exploded view showing a wheel shaft mounting arrangement according to the prior art.
Figure 2:
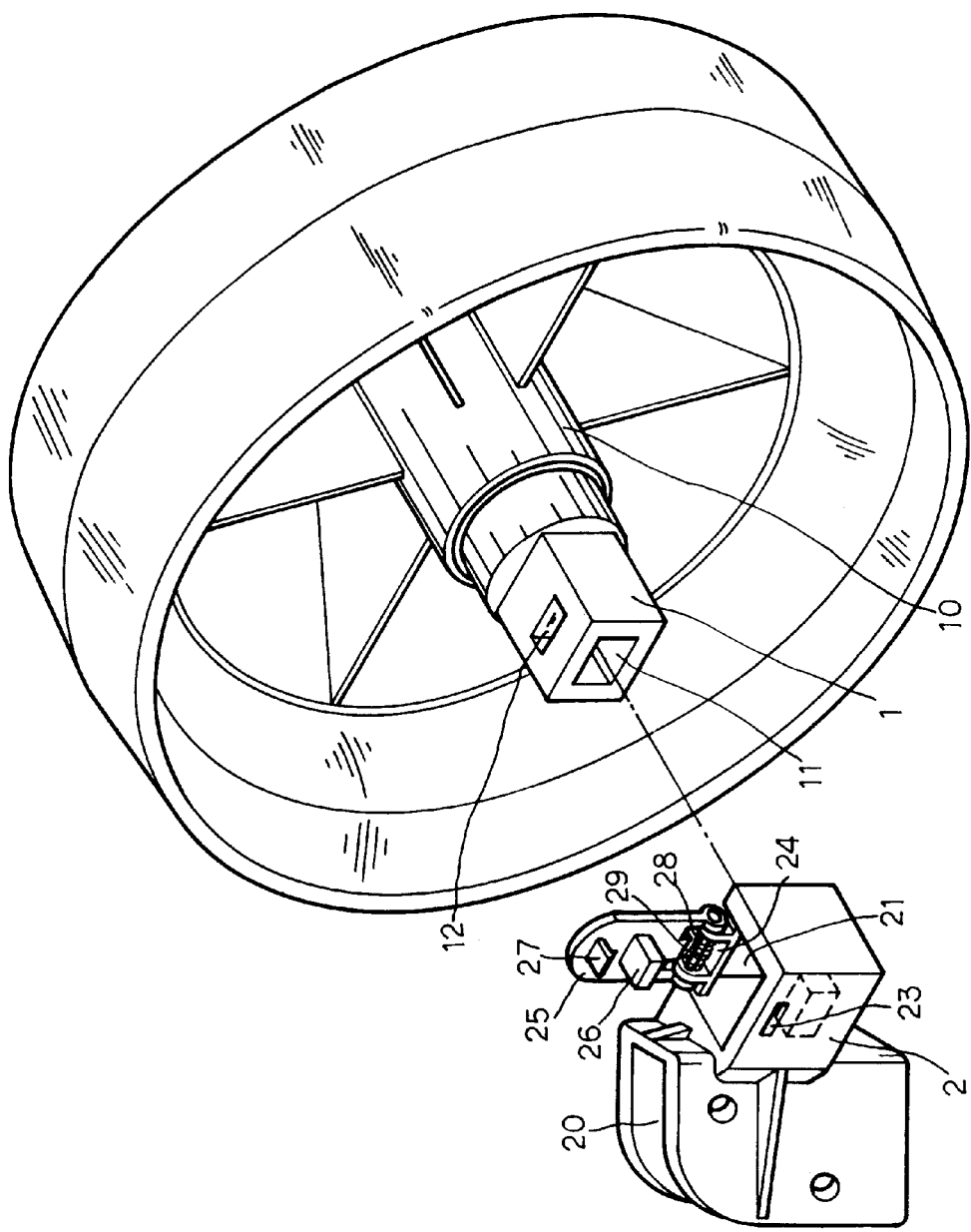
FIG. 2 is an exploded view of a wheel shaft mounting arrangement according to the present invention.
Figure 3:
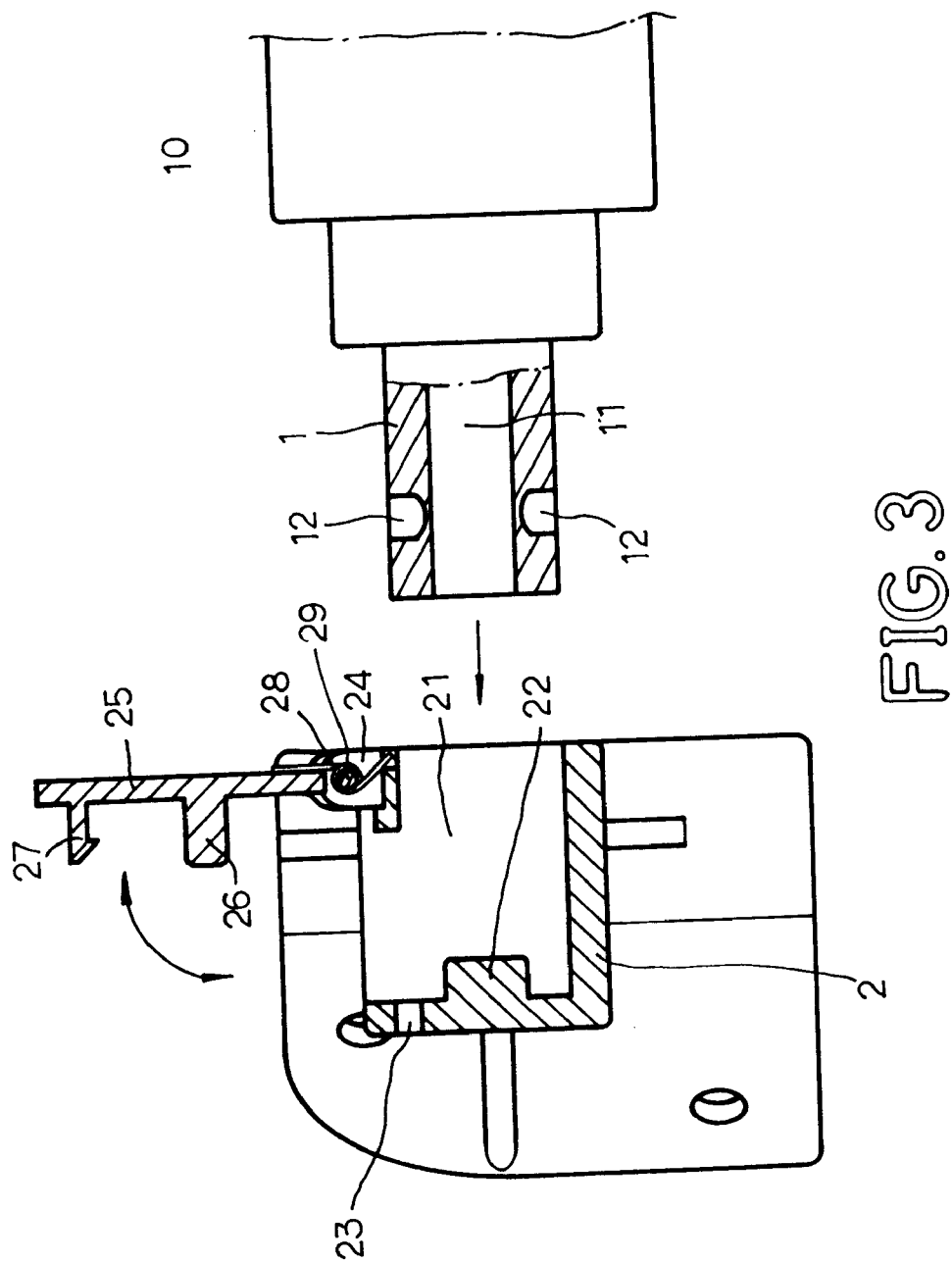
FIG. 3 is a sectional view of the present invention before the installation of the shaft in the shaft holder.

Referring to FIGS. 2 and 3, a wheel shaft mounting arrangement in accordance with the present invention comprises a shaft 1 mounted in the hub 10 of a wheel for a golf cart, and a shaft holder 2. The shaft 1 comprises a rectangular coupling hole 11 axially disposed at the center of its rectangular front end, and two rectangular transverse locating holes 12 respectively perpendicularly extended from the rectangular coupling hole 11 to flat top and bottom side walls of its rectangular front end. The shaft holder 2 comprises a mounting frame 20 formed integral with the peripheral wall thereof, for fastening to the framework of a golf cart, an open chamber 21, for receiving the rectangular front end of the shaft 1, a rectangular locating block 22 raised from its inside wall inside the open chamber 21 for engaging into the rectangular coupling hole 11 at the shaft 1, a hook hole 23 at its back side wall, a fixed plate 24 fixedly disposed in the open chamber 21 at the top, and a movable plate 25 pivoted to the fixed plate 24 by a pivot 29. The movable plate 25 comprises a rectangular plug rod 26 and a hook 27 respectively perpendicularly raised from its bottom sidewalk. The open chamber 21 is surrounded by the peripheral wall of the shaft holder 2, having a front open side through which the rectangular front end of the shaft 1 is inserted into the open chamber 21, and a top open side. The movable plate 25 is turned relative to the fixed plate 24 to close/open the top open side of the open chamber 21. Further, a torsion spring 28 is mounted on the pivot 29 with its two opposite ends respectively connected to the fixed plate 24 and the movable plate 25. The torsion spring 28 imparts a pull force to the movable plate 25, causing the movable plate 25 to be maintained in the closed position (closed on the top open side of the open chamber 21).

Figure 4:
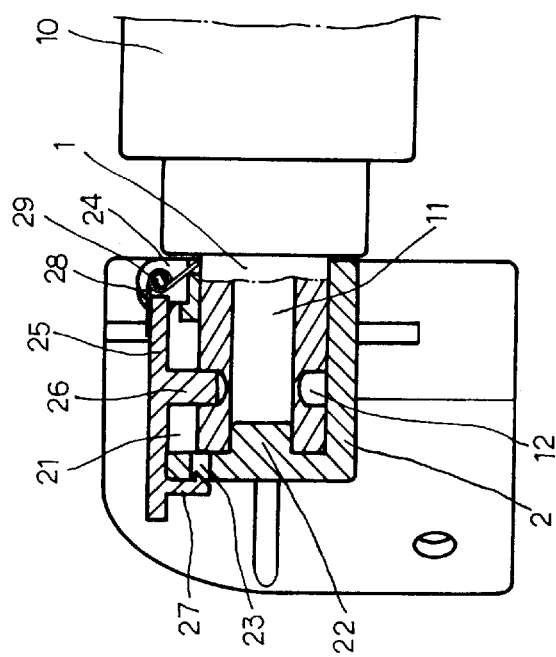
FIG. 4 is another sectional view of the present invention, showing the shaft inserted into the open chamber in the shaft holder and locked.

Referring to FIG. 4 and FIG. 3 again, during installation, the movable plate 25 is opened from the top open side of the open chamber 21, then the rectangular front end of the shaft 1 is inserted through the from open side of the open chamber 21 into the inside of the open chamber 21 for enabling the rectangular locating block 22 to be engaged into the rectangular coupling hole 11 at the shaft 1, and then the movable plate 25 is released from the hand and pulled by the torsion spring 28 to the closed position. When the movable plate 25 is closed, the a rectangular plug rod 26 is plugged into one rectangular transverse locating hole 12 at the shaft 1, and the hook 27 is hooked in the hook hole 23, and therefore the shaft 1 is firmly secured to the shaft holder 2. When dismounting the shaft 1 from the shaft holder 2, the movable plate 25 is opened to disengage the hook 27 and the plug rod 26, from the hook hole 23 at the shaft holder 2 and the respective rectangular transverse locating hole 12 at the shaft 1, enabling the shaft 1 to be removed from the open chamber 21 of the shaft holder 2.

While only one embodiment of the present invention has been shown and described, it will be understood that various modifications and changes could be made thereunto without departing from the spirit and scope of the invention disclosed.

What the invention claimed is:

1. A wheel shaft mounting arrangement comprising a shaft holder securely mounted on the framework of a golf cart and a shaft fastened to said shaft holder to support a wheel, wherein said shaft comprises a rectangular front end, a rectangular coupling hole axially disposed at the center of said rectangular front end, and two rectangular transverse locating holes respectively perpendicularly extended from said rectangular coupling hole to flat top and bottom side walls of said rectangular front end; said shaft holder comprises an open chamber, which receives the rectangular front end of said shaft, a rectangular locating block raised from an inside wall thereof, which is fitted into the rectangular coupling hole at said shaft when said shaft is inserted into said open chamber, a hook hole at a back side wall thereof, a fixed plate fixedly disposed in said open chamber at a top side, and a movable plate pivoted to said fixed plate by a pivot and turned between a first position to lock said shaft and a second position to unlock said shaft, said movable plate comprising a rectangular plug rod, which is engaged into one rectangular transverse locating hole at said shaft when said movable plate is turned to said first position, or disengaged from said shaft when said movable plate is turned from said first position to said second position, and a hook, which is hooked in said hook hole when said movable plate is turned to said first position, or disengaged from said hook hole when said movable plate is turned from said first position to said second position.

2. The wheel shaft mounting arrangement of claim 1 further comprising a torsion spring mounted on said pivot and connected between said fixed plate and said movable plate to pull said movable plate to said first position.

* * * * *